(12) United States Patent
Yun et al.

(10) Patent No.: US 10,717,504 B2
(45) Date of Patent: Jul. 21, 2020

(54) SHUT-OFF VALVE FOR PNEUMATIC FENDER

(71) Applicants: HWASEUNG EXWILL CO., LTD., Busan (KR); Seong Jae Lee, Gangwon-do (KR)

(72) Inventors: Soon Hwan Yun, Busan (KR); Young Chun Kim, Busan (KR); Seong Jae Lee, Gangwon-do (KR)

(73) Assignees: HWASEUNG EXWILL CO., LTD., Busan (KR); Seong Jae Lee, Gangwon-do (KR)

( * ) Notice: Subject to any disclaimer, the term of this patent is extended or adjusted under 35 U.S.C. 154(b) by 0 days.

(21) Appl. No.: 16/352,444

(22) Filed: Mar. 13, 2019

(65) Prior Publication Data
US 2019/0351982 A1   Nov. 21, 2019

(30) Foreign Application Priority Data

May 17, 2018  (KR) .......................... 10-2018-0056506

(51) Int. Cl.
*B63B 59/02* (2006.01)
*B63B 59/00* (2006.01)

(52) U.S. Cl.
CPC .............. *B63B 59/02* (2013.01); *B63B 59/00* (2013.01); *B63B 2059/025* (2013.01)

(58) Field of Classification Search
CPC ................................ B63B 59/00; B63B 59/02
USPC .......................................... 114/219; 405/212
See application file for complete search history.

(56) References Cited

U.S. PATENT DOCUMENTS

| 9,809,940 B2 * | 11/2017 | Yamada .................. B63B 59/02 |
| 2013/0076536 A1 * | 3/2013 | Nakatani ................ G08C 17/02 |
| | | 340/870.02 |
| 2017/0016195 A1 | 1/2017 | Yamada |
| 2017/0022678 A1 | 1/2017 | Yamada |

FOREIGN PATENT DOCUMENTS

| KR | 10-2009-0016036 A | 2/2009 |
| KR | 10-2016-0102575 A | 3/2016 |
| KR | 10-2016-0138386 A | 12/2016 |
| KR | 10-2018-0021322 A | 3/2018 |

* cited by examiner

*Primary Examiner* — Lars A Olson
(74) *Attorney, Agent, or Firm* — Seed IP Law Group LLP (57) ABSTRACT

Disclosed is a shut-off valve installed in an accommodation chamber regulating entry/exit of air. The shut-off valve includes: a body removably disposed in the accommodation chamber and having multiple air passage holes; a valve stem adapted to be moved vertically along a valve stem insertion hole formed in the body; a disc mounted on a disc engagement portion formed at a lower end of the valve stem to open/close at least one of the multiple air passage holes; a rotor disposed on an upper side of the body to vertically move the valve stem, the rotor being provided with an opening/closing indicator to check opening/closing of the shut-off valve outside the accommodation chamber, wherein the accommodation chamber has an upper wall, a lower wall, and a side wall, the body disposed passing through the upper wall and lower wall of the accommodation chamber, and the disc is located outside the accommodation chamber.

12 Claims, 10 Drawing Sheets

SHUT-OFF VALVE FOR PNEUMATIC FENDER

CROSS-REFERENCE TO RELATED APPLICATIONS

This application claims the benefit and priority of Korean Patent Application No. 10-2018-0056506, filed May 17, 2018, the entire disclosure of which is incorporated herein by reference.

BACKGROUND

Technical Field

Embodiments of the present disclosure relate to a shut-off valve, and more particularly, to a shut-off valve for a pneumatic fender, which is easy to remove and install.

Description of the Related Art

A pneumatic fender is a sealable apparatus which is inflated with an appropriate amount of air and disposed between two ships or between a ship and a quay wall to absorb kinetic energy of the ship, thereby preventing damage to the ship. However, if kinetic energy of a ship is too great for the pneumatic fender to absorb, the pneumatic fender can be damaged. In order to solve such a problem, the pneumatic fender is generally provided with a safety valve (Korean Patent Publication No. 10-2009-0016036).

The pneumatic fender is periodically replenished with air to maintain a predetermined internal pressure. In order to determine failure of the safety valve of the pneumatic fender under use conditions, the internal pressure of the pneumatic fender is released to the surrounding atmosphere, followed by separating the safety valve from an accommodation chamber of the pneumatic fender to check the opening pressure of the safety valve. After repair of the safety valve, if necessary, the safety valve is reinstalled at a retainer flange, followed by injection of an appropriate amount of air into the pneumatic fender, and then the pneumatic fender is sealed to be returned to use conditions. However, this process requires high costs and is very time-consuming.

In order to solve such a problem, Korean Patent Publication No. 10-2016-0102575 discloses a pneumatic fender retainer flange in which determination of the opening pressure of a safety valve of a pneumatic fender under use conditions and removal of the safety valve can be conducted simply by forcing, by a pressing member 10, a shut-off valve 9 to a position closing a through-hole 7a formed through a partition 7 constituting an accommodation chamber 8.

However, for the pneumatic fender retainer flange disclosed in Korean Patent Publication No. 10-2016-0102575, when the opening pressure of the safety valve is not reached, the shut-off valve 9, which is in a hole-closing position by the pressing member (applying a pressure ranging from 5% to 20% of an initial internal pressure), is repeatedly opened and closed due to kinetic energy resulting from frequent motion of a ship. This results in deformation of the pressing member, abrasion of the shut-off valve 9, damage to the partition 7 adjacent to the through-hole 7a formed through the accommodation chamber 8, and ultimately air leakage, thereby making it difficult to conduct determination of the opening pressure of the safety valve. In addition, since a seat corresponding to the shut-off valve is formed directly on the partition 7 adjacent to the through-hole 7a formed through the accommodation chamber 8, for repair of the shut-off valve or the seat, it is necessary to separate the entire accommodation chamber 8 of the retainer flange from the pneumatic fender. Further, since the shut-off valve is always in the hole-closing position by the pressing member, a separate communication passage 11 is required to replenish the pneumatic fender with air pressure.

Korean Patent Publication No. 10-2016-0138386 discloses a pneumatic fender retainer flange in which determination of the opening pressure of the safety valve of the pneumatic fender under use conditions and removal of a safety valve can be conducted by forcing, by a securing member 5b, a shut-off valve 9 to a position closing a through-hole 7a formed through a partition 7 constituting an accommodation chamber 8.

However, the pneumatic fender retainer flange disclosed in Korean Patent Publication No. 10-2016-0138386 has a problem in that, since a seat corresponding to the shut-off valve is formed directly on the partition 7 adjacent to the through-hole 7a formed through the accommodation chamber 8, for repair of the shut-off valve or the seat, it is necessary to separate the entirety of the accommodation chamber 8 of the retainer flange from the pneumatic fender.

RELATED ART LITERATURE

Patent Documents (Patent Document 0001) Korean Patent Publication No. 10-2009-0016036

(Patent Document 0002) Korean Patent Publication No. 10-2016-0138386

(Patent Document 0003) Korean Patent Publication No. 10-2016-0102575

BRIEF SUMMARY

Embodiments of the present disclosure provide a shut-off valve for a pneumatic fender, which allows determination as to failure of a safety valve mounted in an accommodation chamber of the pneumatic fender under use conditions without separation of the safety valve from the accommodation chamber, while allowing removal/installation of the safety valve from/into the accommodation chamber without release of the internal pressure of the pneumatic fender.

In accordance with one aspect of the present disclosure, there is provided a shut-off valve installed in an accommodation chamber regulating entry/exit of air, which includes: a body removably disposed in the accommodation chamber and having multiple air passage holes; a valve stem adapted to be vertically moved along a valve stem insertion hole formed in the body; a disc mounted on a disc engagement portion formed at a lower end of the valve stem to open/close at least one of the multiple air passage holes; a rotor disposed on an upper side of the body to vertically move the valve stem, the rotor including an opening/closing indicator to check opening/closing of the shut-off valve outside the accommodation chamber, wherein the accommodation chamber has an upper wall, a lower wall, and a side wall, the body is disposed to pass through the upper wall and the lower wall of the accommodation chamber, and the disc is located outside the accommodation chamber.

According to the present disclosure, opening/closing of the shut-off valve can be checked outside the accommodation chamber and determination as to failure of the safety valve is possible. In addition, the disc is prevented from directly contacting the accommodation chamber in order to prevent abrasion of the accommodation chamber, thereby improving durability of the pneumatic fender.

The shut-off valve may further include a protrusion plate extending from the lower wall, wherein an extension length of the protrusion plate from the lower wall is greater than or equal to a distance from a lowermost portion of the shut-off valve to the lower wall upon opening of the shut-off.

That is, the protrusion plate protruding from the lower wall of the accommodation chamber can protect the shut-off valve partially protruding from the accommodation chamber toward the interior of the pneumatic fender (i.e., an air bag body), thereby improving durability of the shut-off valve.

The body may include: a body protrusion formed at a lower portion of the body to secure the body to the lower wall of the accommodation chamber; a body protrusion O-ring insertion portion recessed in the body protrusion to receive a body protrusion O-ring, the body protrusion O-ring being adapted to improve air tightness between the accommodation chamber and the body; and a seat contacting the disc, wherein the disc has an inclined section on an outer surface thereof and includes a disc pressing member disposed in the inclined section to contact a lower side of the seat such that the disc does not directly contact the accommodation chamber upon opening/closing of the shut-off valve.

That is, according to the present disclosure, the disc is prevented from directly contacting the accommodation chamber and a portion of the disc contacting the seat of the body has a predetermined slope, thereby preventing abrasion of the accommodation chamber while improving air tightness.

The multiple air passage holes may include a longitudinal air passage hole and a transverse air passage hole, and the disc may open/close the longitudinal air passage hole.

That is, according to the present disclosure, the longitudinal air passage hole and the transverse air passage hole are formed in the body to allow a device opening/closing the air passage holes to be disposed inside the body such that the internal space of the accommodation chamber can be efficiently utilized without using a structure simply opening/closing a through-hole of the accommodation chamber. For example, the longitudinal air passage hole and the transverse air passage hole may generally have a T shape.

The shut-off valve may further include: a hollow bushing disposed on the body and having a bushing flange protruding outward; a hollow cover disposed on the bushing and having a cover flange protruding outward; a first bolt tightly securing the body, the bushing, and the cover to one another; and a second bolt tightly securing the bushing to the body, wherein a bolt head of the first bolt may be seated on the cover flange to apply fastening force, and a bolt head of the second bolt may be seated on a second bolt head-seating portion to apply fastening force, the second bolt head-seating portion being recessed in the bushing flange.

That is, the shut-off valve according to the present disclosure includes multiple bolts so as to improve pressing between the corresponding components, wherein bolt heads of the respective bolts are placed at different locations. For example, the second bolt can apply pressing force to the body and the bushing and the first bolt can apply pressing force to the body, the bushing, and the cover.

The rotor may include: a rotational portion imparting torque to the rotor; a support portion extending downward from the rotational portion to improve durability of the rotor, the support portion having a larger thickness than the rotational portion; and a rotor flange extending downward from the support portion to be seated on the body, the rotor flange having a larger thickness than the support portion, and wherein the cover flange may press at least a portion of the support portion in a direction in which the first bolt applies pressing force.

That is, according to the present disclosure, the cover flange is pressed with a predetermined pressure against at least a portion of the support portion to prevent vibration-induced rotation of the rotor, thereby preventing deterioration in durability of the shut-off valve.

The bushing may include a bushing protrusion protruding downward from the bushing flange and pressing at least a portion of the rotor flange in a direction in which the second bolt applies pressing force.

The body may further include: a body flange laterally protruding from the body and disposed on the upper wall of the accommodation chamber; and a rotor seating groove recessed in the body flange and allowing the rotor flange to be seated thereon, wherein a depth of the rotor seating groove is equal to or greater by 0.05 mm to 1 mm than the sum of heights of the rotor flange and the bushing protrusion, the heights being defined with respect to a longitudinal direction of the body. For example, the depth of the rotor seating groove is greater by 0.1 mm to 0.3 mm than the sum of heights of the rotor flange and the bushing protrusion.

The valve stem may include: an axial portion extending in a longitudinal direction of the body; and a male screw formed on an upper side of the axial portion, wherein the rotor may include a female screw having a predetermined radius with respect to a central axis thereof to be engaged with the male screw, the female screw extending to a predetermined height of the rotational portion through the rotor flange such that the valve stem is vertically moved by rotation of the rotor.

Here, upon rotation of the rotor, the disc coupled to the disc engagement portion under the axial portion may be vertically moved to open/close at least some of the multiple air passage holes, for example, the longitudinal air passage hole.

That is, the shut-off valve according to the present disclosure allows easy control over opening/closing of the air passage holes while enabling efficient utilization of the internal space of the accommodation chamber. In addition, with the rotor, a degree of opening/closing of the air passage holes can also be adjusted.

The valve stem may further include a key protruding from the axial portion and the body may further include a key groove formed under the rotor seating groove to guide insertion of the key such that the valve stem is prevented from rotating upon rotation of the rotor.

That is, according to the present disclosure, upon rotation of the rotor, the male screw fastened to the rotor can be prevented from spinning without traction, thereby allowing easy regulation of opening/closing of the shut-off valve.

In accordance with another aspect of the present disclosure, there is provided a method for checking opening/closing of the shut-off valve, wherein opening/closing of the shut-off valve is checked outside the accommodation chamber based on information on position of the male screw, the information being obtained through the opening/closing indicator. For example, the information on position of the male thread may be confirmed through imprints "OPEN" and "CLOSE" on the opening/closing indicator.

According to the embodiments of the present disclosure, determination as to failure of the safety valve can be conducted with the internal pressure of the pneumatic fender maintained.

The embodiments of the present disclosure provides a shut-off valve for a pneumatic fender, which allows determination as to failure of a safety valve through a simple operation of the shut-off valve without separation of the safety valve from an accommodation chamber.

In addition, the shut-off valve according to the embodiments of the present disclosure can be easily removed/installed from/into the accommodation chamber, whereby time and costs associated with repair of the shut-off valve can be considerably reduced.

DETAILED DESCRIPTION

Hereinafter, embodiments of the present disclosure will be described with reference to the accompanying drawings.

Figure 1:
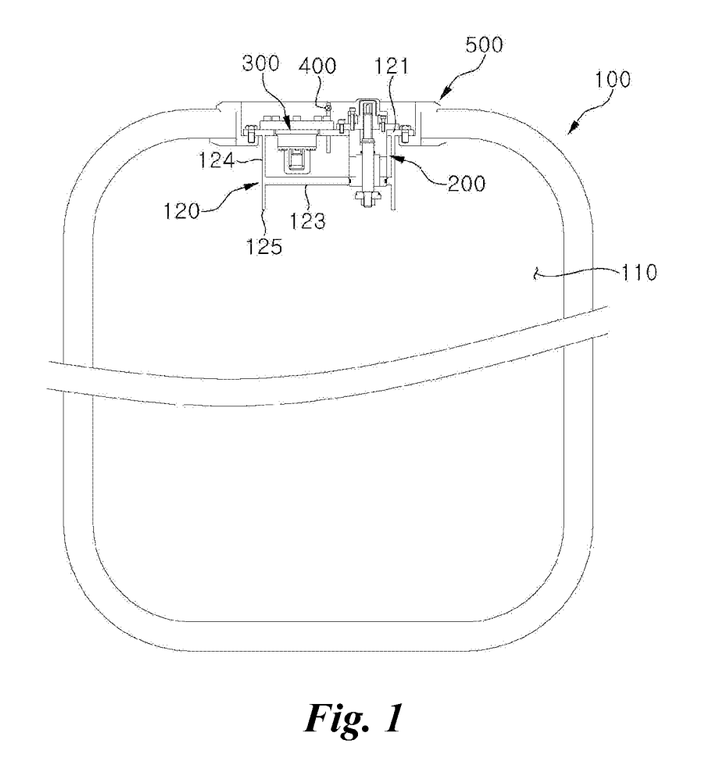
FIG. 1 is a sectional view of a pneumatic fender according to one embodiment of the present disclosure.
Figure 2:
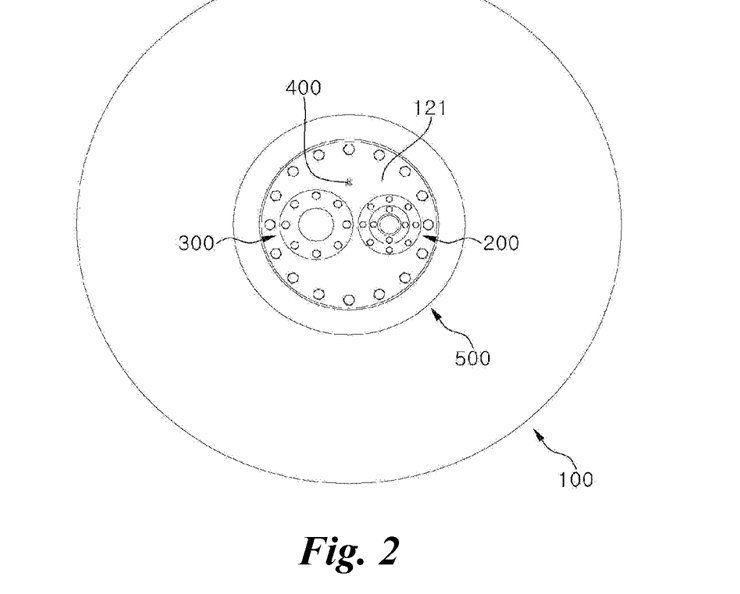
FIG. 2 is a plan view of the pneumatic fender according to the embodiment.

FIG. 1 and FIG. 2 are a sectional view and plan view of a pneumatic fender according to one embodiment of the present disclosure, respectively.

Referring to FIG. 1 and FIG. 2, a pneumatic fender 100 according to this embodiment includes a retainer flange 500 disposed on at least one side thereof and an accommodation chamber 120 disposed in the retainer flange 500.

The retainer flange 500 may include at least one retainer flange and may have, for example, a cylindrical concave shape. In addition, an opening of the retainer flange 500 may be covered with a lid secured with a bolt or the like.

The accommodation chamber 120 may be securely installed in the retainer flange 500 and may have an internal space defined by an upper wall 121, a lower wall 123, and a side wall 124. Each of the upper wall 121 and the lower wall 123 may be formed with a through-hole for installation of a shut-off valve 200. In addition, the accommodation chamber 120 may be provided with an air injection valve 400, a safety valve 300, and the shut-off valve 200, details of which will be described further below.

The upper wall 121 may refer to a member disposed outside the pneumatic fender 100 and the lower wall 123 may refer to a member disposed inside the pneumatic fender 100 to face the upper wall 121. Each of the upper wall and the lower wall may have, for example, a plate shape.

Figure 3:
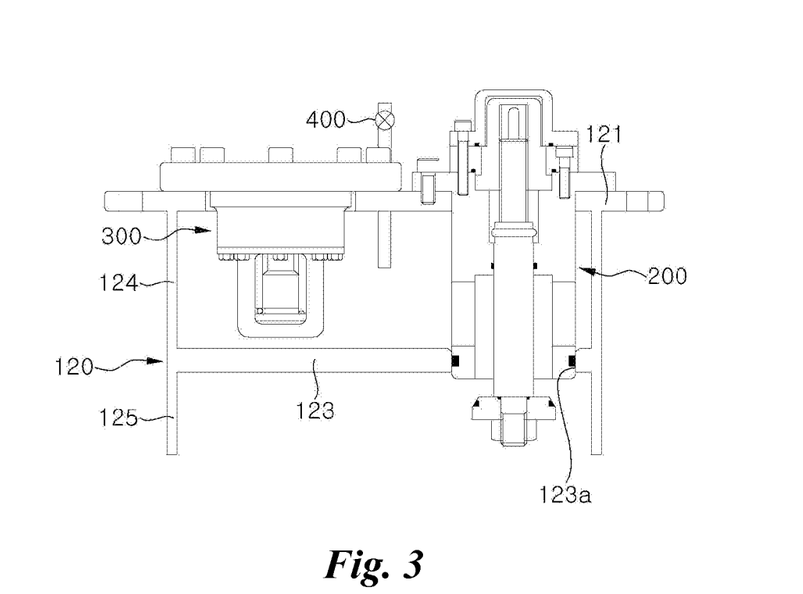
FIG. 3 is a sectional view of an accommodation chamber of the pneumatic fender according to one embodiment of the present disclosure.

FIG. 3 is a sectional view of an accommodation chamber of the pneumatic fender according to one embodiment of the present disclosure.

Referring to FIG. 3, the accommodation chamber 120 may have a space defined by the upper wall 121, the lower wall 123, and the side wall 124. The accommodation chamber 120 may be provided with the air injection valve 400, the safety valve 300 and the shut-off valve 200, and may have members or through-holes for installation of the air injection valve 400, the safety valve 300, and the shut-off valve 200.

The air injection valve 400 allows the accommodation chamber 120 to communicate with the outside of the pneumatic fender 100 such that air can be injected/discharged through the air injection valve 400 so as to supply an appropriate amount of air pressure to an interior 110 of the pneumatic fender 100 by any suitable method known in the art. By way of example, the air injection valve 400 may be disposed on the upper wall 121.

The safety valve 300 allows the interior of the pneumatic fender 100 to communicate with the outside of the pneumatic fender 100 via the accommodation chamber 120 and may be operated by any suitable method known in the art. By way of example, opening/closing of the safety valve 300 may be automatically adjusted depending on whether the internal pressure of the pneumatic fender 100 is above or below a predetermined pressure value. The safety valve 300 may be disposed on the upper wall 121 to be located in the internal space of the accommodation chamber 120.

The shut-off valve 200 allows the interior 110 of the pneumatic fender to communicate with the accommodation chamber 120 and may be disposed to pass through the upper wall 121 and the lower wall 123. That is, at least a portion (an opening/closing indicator 224 described below) of one end of the shut-off valve 200 protrudes above the upper wall 121 such that a user can easily check opening/closing of the shut-off valve 200 from outside. In addition, at least a portion (a disc described below) of the other end of the shut-off valve 200 protrudes below the lower wall 123 so as to reduce the volume of the accommodation chamber 120. Further, the shut-off valve 200 may be switched to a closed position by pulling the shut-off valve 200 from the interior of the pneumatic fender 100 to the interior of the accommodation chamber 120 rather than by pushing the shut-off valve 200 from the interior of the accommodation chamber 120 to the interior of the pneumatic fender 100 such that the shut-off valve 200 can remain in the closed position without use of excessive force, thereby preventing deterioration in durability of the shut-off valve 200 due to mechanical overload.

The shut-off valve 200 according to the present disclosure is differentiated in structure from conventional shut-off valves in the related art to provide remarkable effects. Now, details thereof will be described.

Figure 4:
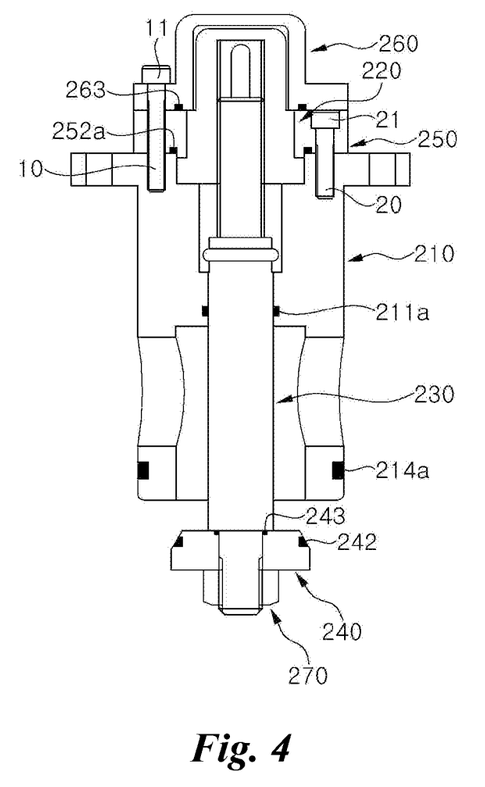
FIG. 4 is a sectional view of a shut-off valve according to one embodiment of the present disclosure, wherein the shut-off valve is in an open position.
Figure 5:
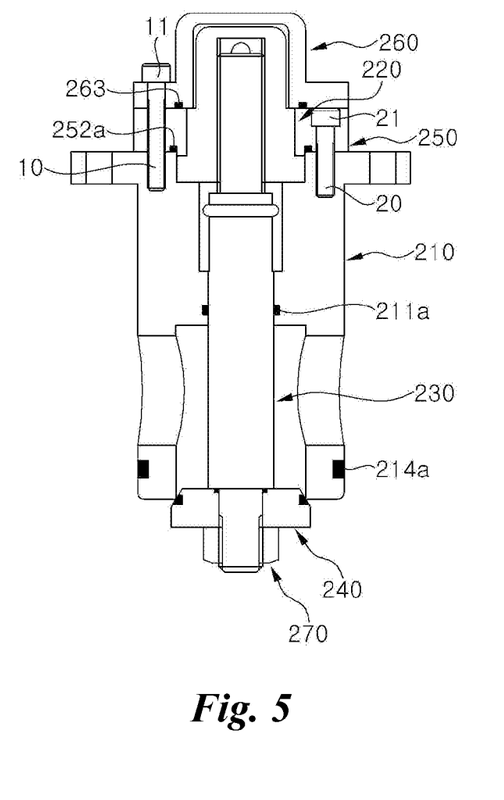
FIG. 5 is a sectional view of the shut-off valve, wherein the shut-off valve is in a closed position.

FIG. 4 is a sectional view of a shut-off valve according to one embodiment of the present disclosure, wherein the shut-off valve is in an open position and FIG. 5 is a sectional view of the shut-off valve, which is in a closed position.

Referring to FIG. 4 and FIG. 5, the shut-off valve 200 includes a body 210, a rotor 220, a valve stem 230, a disc 240, a bushing 250, a cover 260, and a nut 270.

For example, the shut-off valve 200 may include a body 210 having an internal space through which air passes, a disc 240 mounted on one end of a valve stem 230 to open/close the internal space, a rotor 220 vertically moving the valve stem 230, a bushing 250 preventing the shut-off valve 200 from being corroded by seawater, and a cover 260, details of which will be described below.

Figure 6:
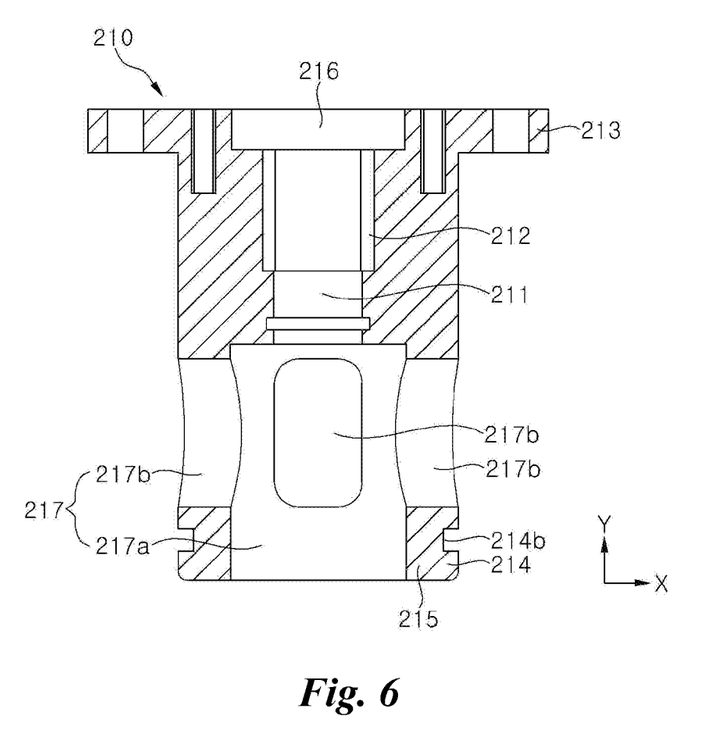
FIG. 6 is a sectional view of a body according to one embodiment of the present disclosure.
Figure 7:
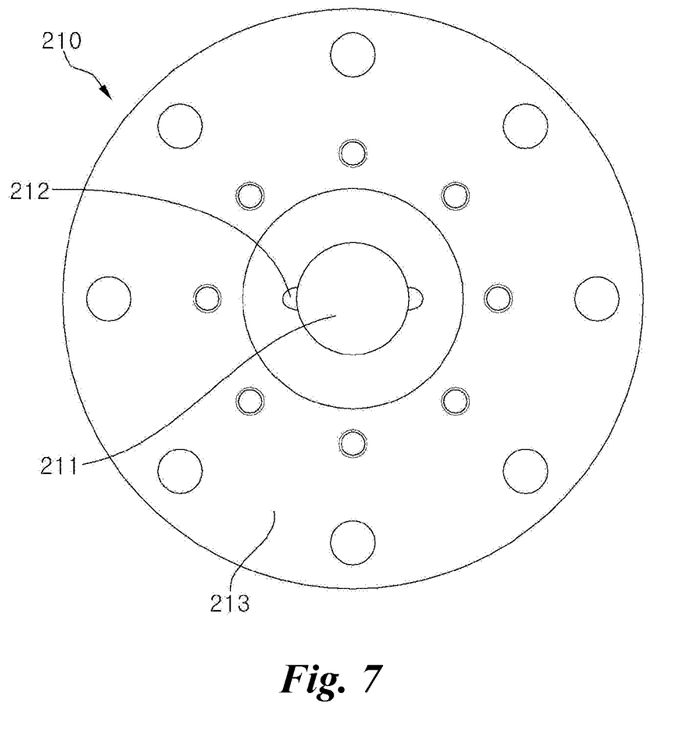
FIG. 7 is a plan view of the body.

FIG. 6 is a sectional view of a body 210 according to one embodiment of the present disclosure and FIG. 7 is a plan view of the body.

The body 210 is configured such that the shut-off valve 200 is disposed to pass through the upper wall 121 and the lower wall 123 of the accommodation chamber 120 and allows the accommodation chamber 120 to communicate with the interior of the pneumatic fender 100.

Referring to FIG. 6 and FIG. 7, the body 210 includes a body flange 213, air passage holes 217, a body protrusion 214, a seat 215, a valve stem insertion hole 211, a key groove 212, and a rotor seating groove 216.

The body flange 213 protrudes outwards from the body 210 such that the body 210 can be securely mounted on the upper wall 121 of the accommodation chamber 120, and may be formed with at least one through-hole into which a bolt is inserted.

The air passage holes 217 allow the interior of the pneumatic fender 100 to communicate with the accommodation chamber 120. The air passage holes 217 may generally have a T shape. For example, the air passage holes 217 may include an air passage hole extending a predetermined length in the y-axis direction from a lower end of the body 210 and an air passage hole extending in the x-axis direction from the through-hole extending in the y-axis direction. Here, the air passage holes 217 may include multiple air passage holes extending in the x-axis direction. Herein, the y-axis direction may refer to a longitudinal direction of the body 210 and the x-axis direction may refer to a transverse direction of the body 210, as shown in FIG. 6. Hereinafter, the air passage hole extending in the y-axis direction will be referred to as a longitudinal air passage hole 217a and the air passage hole extending in the y-axis direction will be referred to as a transverse passage hole 217b. That is, air inside the pneumatic fender 100 flows into the body 210 through the longitudinal air passage hole 217a and then flows into the accommodation chamber 120 through the transverse air passage hole 217b.

The seat 215 directly contacts the disc 240, which opens/closes a space between the accommodation chamber 120 and the interior of the pneumatic fender 100, such that the disc 240 contacts a part of the shut-off valve 200, that is, the seat 215, rather than directly contacting the accommodation chamber 120, whereby abrasion of the accommodation chamber 120 can be prevented while allowing easy replacement and installation of the disc. In addition, even after long-term use, sealing force of the disc can be maintained simply by replacing a disc pressing member 242 of the disc 240. For example, the seat 215 may be integrally formed with the body.

The body protrusion 214 allows the body 210 to be securely mounted on a lower wall installation portion 123a of the accommodation chamber 120, and may be formed with a body protrusion O-ring insertion portion 214b, into which a body protrusion O-ring 214a is inserted to improve sealing force against the lower installation portion 123a. For example, the body protrusion 214 may be integrally formed with the seat 215 to be located outside the seat 215.

The valve stem insertion hole 211 allows the valve stem 230 vertically moving the disc 240 attached to an end thereof to be inserted thereinto and to be moved therealong, and prevents the valve stem 230 from being bent or broken in the event of impact on the pneumatic fender 100. Here, as shown in FIG. 4 and FIG. 5, the valve stem insertion hole 211 may be provided with a valve stem O-ring 211a to improve sealing force between an axial portion 231 of the valve stem and the body 210.

The key groove 212 allows a key 233 of the valve stem 230 to be seated thereon to prevent the valve stem 230 from rotating upon rotation of the rotor 220 described below, thereby allowing the valve stem 230 to be vertically moved by rotation of the rotor 220.

The rotor seating groove 216 is a stepped recess formed at an upper end of the body 210 and allows the rotor 220 to be rotatable thereon.

Figure 8:
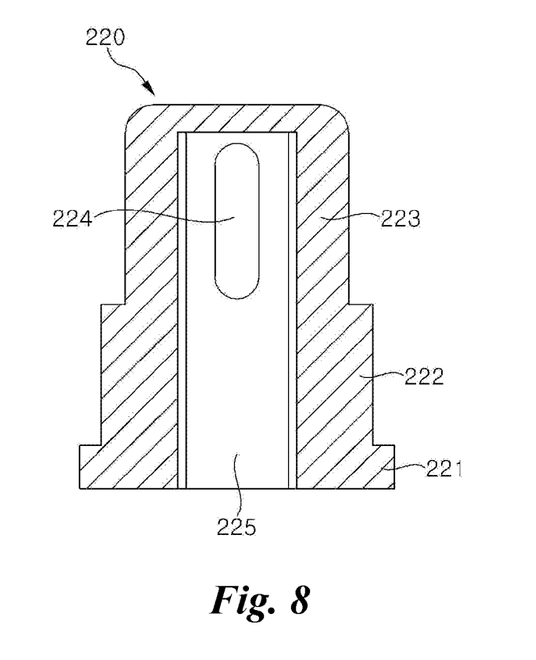
FIG. 8 is a sectional view of a rotor according to one embodiment of the present disclosure.
Figure 9:
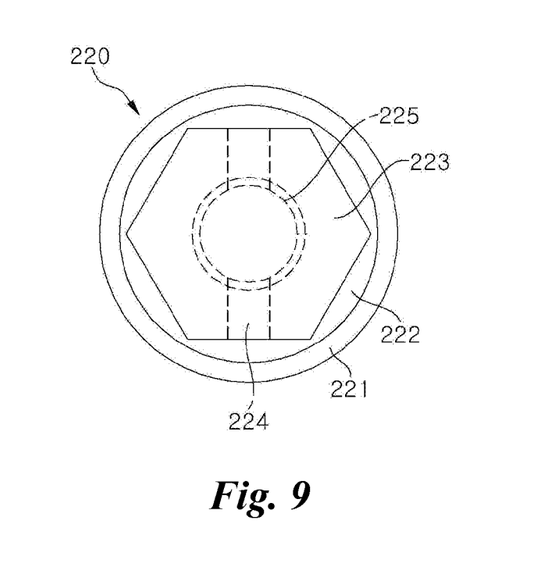
FIG. 9 is a plan view of the rotor.

FIG. 8 is a sectional view of a rotor according to one embodiment of the present disclosure and FIG. 9 is a plan view of the rotor.

Referring to FIG. 8 and FIG. 9, the rotor 220 includes a rotor flange 221, a support portion 222, a rotational portion 223, a female screw 225, and an opening/closing indicator 224.

The rotor 220 may include at least two sections having different thicknesses. For example, the thicknesses of the rotor flange 221, the support portion 222, and the rotational portion 223 may be different from one another. By way of example, the rotor, as to thicknesses, may satisfy the following inequality: the rotor flange 221>the support portion 222>the rotational portion 223.

The rotor flange 221 has a section protruding outwardly of the rotor 220 to be seated on the rotor seating groove 216 of the body 210.

The support portion 222 is inserted into a rotor insertion hole 253 of the bushing 250 to be slidingly rotated by operating the rotational portion 223 described below using an external tool, and is stepped with respect to the rotational portion 223 to be prevented from being damaged.

The rotational portion 223 is operated using an external tool to open/close the shut-off valve 200. In addition, the rotational portion may be formed with the opening/closing indicator 224 and may be imprinted with "OPEN" and "CLOSE."

For example, the rotational portion 223 may have a polygonal shape, for example, a hexagonal shape, to be easily operated using an external tool.

The female screw 225 may be formed at a central portion of the rotor 220 to vertically move the valve stem 230 via a male screw 232 of the valve stem 230, described below, upon rotation of the rotor 220.

The opening/closing indicator 224 allows a user to check opening/closing of the longitudinal air passage hole 217a of the shut-off valve 200, and may include various types of indications. By way of example, opening/closing of the longitudinal air passage hole 217a may be determined depending on the degree to which the opening/closing indicator 224 is hidden by the male screw 232 inserted into the female screw 225. For example, the opening/closing indicator 224 may be provided in the form of a transparent window and may have imprints, "CLOSE" and "OPEN," at respective upper and low portions thereof such that a user can check opening/closing of the shut-off valve 200 from outside.

Figure 10:
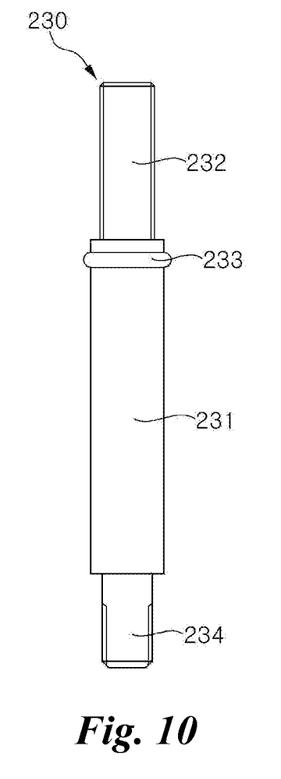
FIG. 10 is a front view of a valve stem according to one embodiment of the present disclosure.
Figure 11:
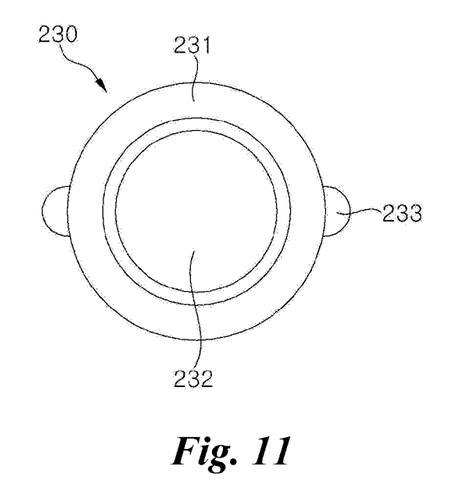
FIG. 11 is a plan view of the valve stem.

FIG. 10 is a front view of a valve stem according to one embodiment of the present disclosure and FIG. 11 is a plan view of the valve stem.

Referring to FIG. 10 and FIG. 11, the valve stem 230 includes an axial portion 231, a disc engagement portion 234, a key 233, and a male screw 232.

The axial portion 231 extends in a longitudinal direction of the body and may be provided at respective opposite ends thereof with the male screw 232 and the disc engagement portion 234. In addition, the axial portion 231 may be inserted into the valve stem insertion hole 211 of the body 210 to be prevented from being bent or broken in the event of impact to the pneumatic fender 100.

The male screw 232 is engaged with the female screw 225 of the rotor 220 to be vertically moved by rotation of the rotor 220, that is, rotation of the female screw 225.

The disc engagement portion 234 allows the disc 240 opening/closing the longitudinal air passage hole 217a to be coupled thereto.

The key 233 serves to prevent the valve stem 230 from spinning without traction inside the valve stem insertion hole 211 of the body 210. That is, with the key 233 seated on the key groove 212 of the body 210, the valve stem 230 can be vertically moved without spinning with no traction. For example, referring to FIG. 11, the key 233 protrudes from the axial portion 231 in a longitudinal direction of the axial portion 231 and the key groove 212 has a concave shape corresponding to the shape of the key 233 such that, upon rotation of the female screw 225, the male screw 232 can be vertically moved without idling.

Figure 12:
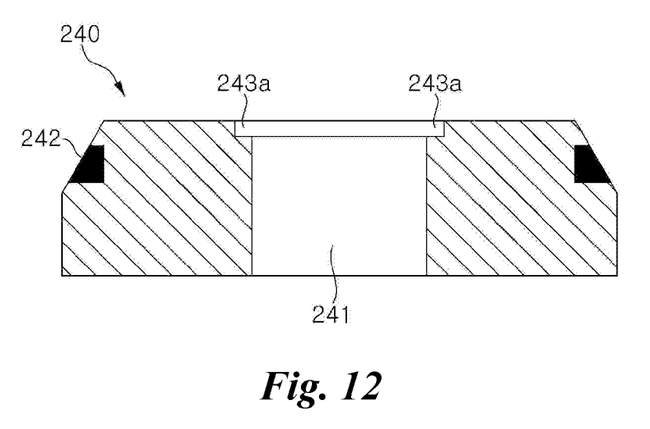
FIG. 12 is a sectional view of a disc according to one embodiment of the present disclosure.

FIG. 12 is a sectional view of a disc according to one embodiment of the present disclosure.

Referring to FIG. 12, the disc 240 includes a disc engagement portion insertion hole 241, a disc pressing member 242, and a disc O-ring insertion portion 243a.

The disc engagement portion 234 of the valve stem 230 may be secured to the disc using a nut 270 after passing through the disc engagement portion insertion hole 241 such that the disc 240 can open/close the longitudinal air passage hole 217a through vertical movement of the valve stem 230.

The disc pressing member 242 may be fitted into the disc 240 and may correspond in shape to a portion of the seat 215 at which the longitudinal air passage hole 217a begins. The disc pressing member 242 may be formed of a flexible material, an elastic material or the like to prevent abrasion in a contact region between metal parts.

The disc O-ring insertion portion 243a is formed by recessing the upper surface of the disc 240 and allows the disc O-ring 243 to be fitted thereto to provide sealing force against the disc engagement portion 234 of the valve stem 230, thereby preventing air from passing through the disc engagement portion insertion hole 241. Here, the upper surface of the disc 240 refers to a surface of the disc which faces the accommodation chamber 120 and the lower surface of the disc 240 refers to a surface of the disc which contacts the nut 270.

Figure 13:
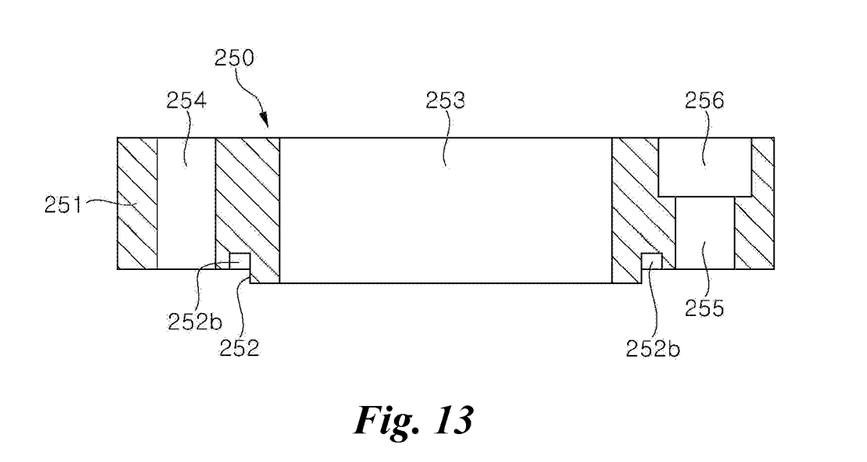
FIG. 13 is a sectional view of a bushing according to one embodiment of the present disclosure.

FIG. 13 is a sectional view of a bushing according to one embodiment of the present disclosure.

The bushing 250 is disposed on the upper surface of the body 210 to prevent the rotor 220 and the body 210 from being corroded by seawater.

Referring to FIG. 13, the bushing 250 includes a bushing flange 251, a bushing protrusion 252, a rotor insertion hole 253, a first bolt insertion hole 254, a second bolt insertion hole 255, and a second bolt head-seating portion 256.

The bushing flange 251 is seated on and coupled to the body flange 213 and may be secured by a first bolt 10 and a second bolt 20 described below.

The bushing protrusion 252 protrudes from the bushing flange 251 toward the body 210 to downwardly press the rotor flange 221 seated on the rotor seating groove 216. For example, the depth of the rotor seating groove 216 may be equal to or greater by 0.05 mm to 1 mm than the sum of the heights of the rotor flange 221 and the bushing protrusion 252. For example, the depth of the rotor seating groove 216 may be greater by 0.1 mm to 0.3 mm than the sum of the heights of the rotor flange 221 and the bushing protrusion 252.

The rotor insertion hole 253 may receive the support portion 222 of the rotor 220. Here, the support portion 222 of the rotor 220 may be inserted into the bushing 250 from below until the rotor flange 221 contacts the bushing protrusion 252.

The bushing 250 may be secured to the body 210 using bolts. For example, the bolts may include a first bolt 10 and a second bolt 20, wherein a bolt head 11 of the first bolt 10 is pressed against the cover 260 (FIG. 14) and a bolt head 21 of the second bolt 20 is pressed against the bushing 250. That is, in the shut-off valve 200 according to the embodiment of the present disclosure, fastening positions of the first bolt 10 and the second bolt 20 are different, thereby improving both coupling force between the body 210 and the bushing 250 and coupling force between the bushing 250 and the cover 260.

For example, the bushing flange 251 may be formed with the second bolt head-seating portion 256, on which the bolt head of the first bolt is seated to apply pressing force to the body 210 from the bushing 250 such that the bushing 250 can be securely pressed against the body 210. Here, the second bolt head-seating portion 256 is formed by recessing the bushing flange 251, wherein the depth of the second bolt head-seating portion may be greater than the height of the bolt head 21 of the second bolt.

For example, the bushing 250 may include the first bolt insertion hole 254, wherein the bolt head 11 of the first bolt is pressed against the cover 260 such that the bushing 250, the cover 260, and the body 210 can be securely pressed against one another by pressing force applied to the body 210 from the cover 260.

The bushing 250 may further include a bushing O-ring insertion portion 252b. Into the bushing O-ring insertion portion, a sealing bushing O-ring 252a may be inserted to be coupled to the bushing 250 to prevent the rotor 220 and the valve stem 230 from being corroded by seawater.

Figure 14:
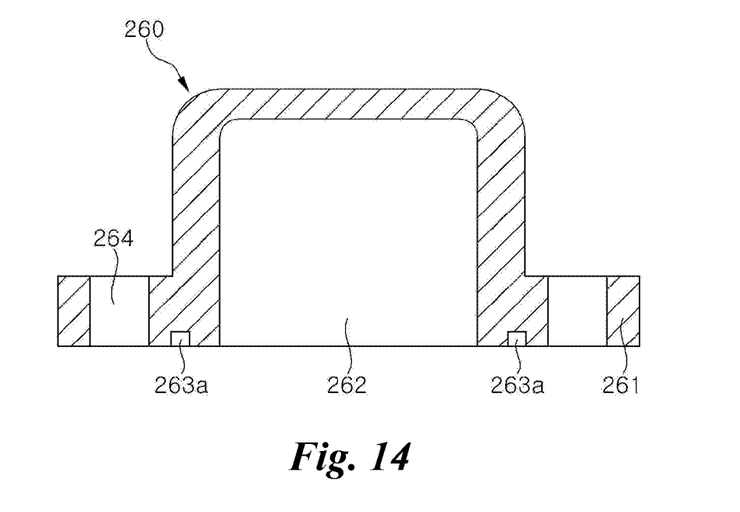
FIG. 14 is a sectional view of a cover according to one embodiment of the present disclosure.

FIG. 14 is a sectional view of a cover according to one embodiment of the present disclosure.

The cover 260 encloses the rotor 220 to prevent arbitrary operation of the shut-off valve 200 caused by arbitrary operation of the rotor 220.

The cover 260 includes a cover flange 261, a rotor insertion groove 262, a cover O-ring insertion portion 263a, and a first bolt insertion hole 264.

The cover flange 261 contacts the bushing flange 251. With the first bolt 10, the cover flange 261 can press the bushing flange 251 against the body flange 213. Here, the cover flange 261 may contact the bushing flange 251 and the support portion 222 of the rotor 220 to secure the bushing 250 and the rotor 220 to the body 210.

The rotor insertion groove 262 receives the rotational portion 223 of the rotor 220, and may be separated a predetermined distance from the rotational portion 223 of the rotor 220.

The first bolt insertion hole 264 may be formed through the cover flange 261 such that the bolt head 11 of the first bolt is seated on an upper surface of the cover flange 261 to tightly secure the cover 260 to the bushing 250 and the body 210.

Next, a method for installing the shut-off valve 200 in the pneumatic fender 100 according to one embodiment of the present disclosure will be described with reference to the accompanying drawings.

First, the valve stem 230 is inserted into the valve stem insertion hole 211 of the body 210 such that the key 233 of the valve stem 230 is slidingly inserted into the key groove 212 of the body 210. Then, after the disc engagement portion 234 formed at the lower end of the valve stem 230 is inserted into the through-hole 241 of the disc 240 and is fastened with the nut 270, the female screw 225 of the rotor 220 is engaged with the male screw 232 formed at the upper end of the valve stem 230. Then, after the support portion 222 of the rotor 220 is inserted into the rotor insertion hole 253 of the bushing 250, the bushing flange 251 of the bushing 250 is coupled to the body flange 213.

Here, the valve stem 230 is adapted to be vertically moved by rotation of the rotor 220. As the valve stem is moved up or down, the disc 240 of the shut-off valve 200 is pressed against or separated from the seat 215 of the body 210 to close or open the shut-off valve 200.

In addition, opening/closing of the shut-off valve 200 can be checked through the opening/closing indicator 224 of the rotor 220.

After completion of assembly of the shut-off valve 200 as above, the body flange 213 integrally formed at the upper side of the body 210 is coupled to the upper wall 121 of the accommodation chamber 120 along with the safety valve 300. Thereafter, the pneumatic fender 100 is inflated by supplying air to the interior of the pneumatic fender through the air injection valve 400 and is then bound to a quay wall or a side surface of a ship with a rope or the like.

Next, a method for determining failure of the shut-off valve 200 and the safety valve 300 of the pneumatic fender 100 including the shut-off valve 200 according to one embodiment of the present disclosure will be described.

For periodic testing of the shut-off valve 200 and the safety valve 300, first, the shut-off valve 200 is operated to a closed position without releasing the internal pressure of the pneumatic fender 100, followed by checking opening/closing of the shut-off valve 200 through the opening/closing indicator 224. Then, the air injection valve 400 is opened, followed by checking leakage from the shut-off valve 200. When there is no leakage from the shut-off valve 200, compressed air is supplied to the accommodation chamber 120 through the air injection valve 400, followed by determining the opening pressure of the safety valve 300. That is, the opening pressure of the safety valve 300 may be tested by closing the shut-off valve 200, which allows the accommodation chamber 120 to communicate with the interior 110 of the pneumatic fender, to shut off air pressure from the interior 110 of the pneumatic fender while supplying compressed air through the air injection valve 400. Here, if the safety valve 300 is in need of repair or replacement, corresponding operations may be performed without releasing air from the interior 110 of the pneumatic fender to the surrounding atmosphere.

When leakage from the shut-off valve 200 is confirmed, the shut-off valve 200 is switched to an open position to release air from the pneumatic fender 100 to the surrounding atmosphere. Then, only the shut-off valve 200 is removed from the accommodation chamber 120 for repair or replacement. Thereafter, the shut-off valve 200 is reinstalled in the accommodation chamber 120. Then, the shut-off valve 200 is switched to the closed position and compressed air is supplied to the accommodation chamber 120 of the pneumatic fender 100 through the air injection valve 400 to test the opening pressure of the safety valve 300.

After completion of testing, the air injection valve 400 is closed and the shut-off valve 200 is operated to the open position, followed by checking opening/closing of the shut-off valve 200. Then, the air injection valve 400 is opened to replenish the pneumatic fender 100 with an appropriate amount of air. Then, with the air injection valve 400 closed, the shut-off valve 200 is sealed with the cover 260 to switch the pneumatic fender 100 to normal use conditions.

When the pneumatic fender is under normal use conditions, the shut-off valve 200 is open and the internal pressure of the pneumatic fender has an influence on the safety valve 300 through the accommodation chamber 120. When a preset pressure value is reached by kinetic energy of a ship, the safety valve 300 is opened to release air from the interior 110 of the pneumatic fender to the surrounding atmosphere to protect the pneumatic fender.

That is, the pneumatic fender 100 including the shut-off valve 200 according to the embodiments allows determination as to failure of the safety valve 300 under use conditions without separation of the safety valve 300 from the accommodation chamber 120, and allows removal and installation of the safety valve 300 without release of the internal pressure of the pneumatic fender 100, thereby enabling easy checking of opening/closing of the shut-off valve 200 from outside.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A shut-off valve installed in an accommodation chamber regulating entry/exit of air, the shut-off valve comprising:
    a body removably disposed in the accommodation chamber and having multiple air passage holes;
    a valve stem adapted to be vertically moved along a valve stem insertion hole formed in the body;
    a disc mounted on a disc engagement portion formed at a lower end of the valve stem to open/close at least one of the multiple air passage holes;
    a rotor disposed on an upper side of the body to vertically move the valve stem, the rotor comprising an opening/closing indicator to check opening/closing of the shut-off valve outside the accommodation chamber,
    wherein the accommodation chamber has an upper wall, a lower wall, and a side wall; the body is disposed to pass through the upper wall and the lower wall of the accommodation chamber; and the disc is located outside the accommodation chamber.

2. The shut-off valve according to claim 1, further comprising:
    a protrusion plate extending from the lower wall,
    wherein an extension length of the protrusion plate from the lower wall is greater than or equal to a distance from a lowermost portion of the shut-off valve to the lower wall upon opening of the shut-off valve.

3. The shut-off valve according to claim 1, wherein the body comprises:
    a body protrusion formed at a lower portion of the body to secure the body to the lower wall of the accommodation chamber;
    a body protrusion O-ring insertion portion recessed in the body protrusion to receive a body protrusion O-ring, the body protrusion O-ring being adapted to improve air tightness between the accommodation chamber and the body; and
    a seat contacting the disc, the disc having an inclined section on an outer surface thereof and comprising a disc pressing member disposed in the inclined section to contact a lower side of the seat such that the disc does not directly contact the accommodation chamber upon opening/closing of the shut-off valve.

4. The shut-off valve according to claim 3, wherein the multiple air passage holes comprise a longitudinal air passage hole and a transverse air passage hole, and the disc opens/closes the longitudinal air passage hole.

5. The shut-off valve according to claim 1, further comprising:
   a hollow bushing disposed on the body and having a bushing flange protruding outward;
   a hollow cover disposed on the bushing and having a cover flange protruding outward;
   a first bolt tightly securing the body, the bushing, and the cover to one another; and
   a second bolt tightly securing the bushing to the body,
   wherein a bolt head of the first bolt is seated on the cover flange to apply fastening force and a bolt head of the second bolt is seated on a second bolt head-seating portion to apply fastening force, the second bolt head-seating portion being recessed in the bushing flange.

6. The shut-off valve according to claim 5, wherein the rotor comprises:
   a rotational portion imparting torque to the rotor;
   a support portion extending downward from the rotational portion to improve durability of the rotor, the support portion having a larger thickness than the rotational portion; and
   a rotor flange extending downward from the support portion to be seated on the body, the rotor flange having a larger thickness than the support portion, and
   wherein the cover flange presses at least a portion of the support portion in a direction in which the first bolt applies pressing force.

7. The shut-off valve according to claim 6, wherein the bushing comprises a bushing protrusion protruding downward from the bushing flange and pressing at least a portion of the rotor flange in a direction in which the second bolt applies pressing force.

8. The shut-off valve according to claim 7, wherein the body further comprises:
   a body flange laterally protruding from the body and disposed on the upper wall of the accommodation chamber; and
   a rotor seating groove recessed in the body flange and allowing the rotor flange to be seated thereon,
   wherein a depth of the rotor seating groove is greater by 0.05 mm to 1 mm than the sum of heights of the rotor flange and the bushing protrusion, the heights being defined with respect to a longitudinal direction of the body.

9. The shut-off valve according to claim 1, wherein the valve stem comprises:
   an axial portion extending in a longitudinal direction of the body; and
   a male screw formed on an upper side of the axial portion,
   wherein the rotor comprises a female screw having a predetermined radius with respect to a central axis thereof to be engaged with the male screw, the female screw extending to a predetermined height of the rotational portion through the rotor flange such that the valve stem is vertically moved by rotation of the rotor.

10. The shut-off valve according to claim 9, wherein, upon rotation of the rotor, the disc coupled to the disc engagement portion under the axial portion is vertically moved to open/close at least some of the multiple air passage holes.

11. The shut-off valve according to claim 9, wherein the valve stem further comprises a key protruding from the axial portion, and the body further comprises a key groove formed under the rotor seating groove to guide insertion of the key such that the valve stem is prevented from rotating upon rotation of the rotor.

12. A method for checking opening/closing of the shut-off valve according to claim 9, wherein opening/closing of the shut-off valve is checked outside the accommodation chamber based on information on position of the male screw, the information being obtained through the opening/closing indicator.

* * * * *